United States Patent [19]
Davies et al.

[11] 3,760,153
[45] Sept. 18, 1973

[54] APPARATUS FOR PERFORATING THERMOPLASTIC SHEET MATERIALS WITH AN ELECTRIC ARC

[75] Inventors: Robert Dillwyn Davies, Wilmington, Del.; Leslie Yarnall Weston, Jr., Avondale, Pa.

[73] Assignee: E. I. du Pont de Nemours and Company, Wilmington, Del.

[22] Filed: Feb. 16, 1972

[21] Appl. No.: 226,804

[52] U.S. Cl. ................. 219/384, 204/323, 264/154
[51] Int. Cl. ............................................ H05b 7/18
[58] Field of Search ................. 219/383, 384; 34/1; 346/74; 204/323; 264/154

[56] References Cited
UNITED STATES PATENTS
2,551,466  5/1951  Salmon-Legaqneur et al....... 346/74
2,141,869  12/1938  König................................... 219/384
3,167,641  1/1965  Parmele et al...................... 219/384

FOREIGN PATENTS OR APPLICATIONS
593,891  10/1947  Great Britain ...................... 219/384
1,105,699  4/1961  Germany ............................ 219/384
555,582  0/1958  Canada................................ 219/384
647,310  5/1939  Germany ............................ 219/384

*Primary Examiner*—Volodymyr Y. Mayewsky
*Attorney*—Louis Del Vecchio

[57] ABSTRACT

Apparatus for perforating thermoplastic sheets by controlled high current density electric arcing through the sheet, wherein the high current density arc is established between electrically charged and grounded electrodes, both electrodes comprising discs having at least one pin mounted on the periphery thereof, the discs synchronously rotating such that a grounding pin opposes a charged pin at the desired spacing of perforations to cause an electric arc to form said perforations.

3 Claims, 6 Drawing Figures

PATENTED SEP 18 1973 3,760,153

APPARATUS FOR PERFORATING THERMOPLASTIC SHEET MATERIALS WITH AN ELECTRIC ARC

BACKGROUND OF THE INVENTION

This invention relates to a process and apparatus for perforating a thermoplastic film by an electric arc discharged through the sheet.

Thermoplastic sheet materials have many widespread uses. One particular use is as a packaging sheet material. When used to package some items such as foodstuffs, e.g., fresh fruit or vegetables, it is desirable to use a packaging material that has holes in it to allow water to escape. In addition, it would be desirable to use a sheet material which is a thermoplastic foam to provide cushioning for the item being packaged. Therefore, there is a need for means for perforating films including films prepared from thermoplastic foams to be used for packaging foodstuffs.

SUMMARY OF THE INVENTION

Accordingly, this invention provides a process and apparatus for perforating thermoplastic sheet material. The apparatus consists essentially of:

a. means for continuously advancing a thermoplastic sheet;

b. at least two electrodes positioned on opposite sides of the advancing sheet, wherein one electrode is electrically grounded and the other electrode is a pin electrode electrically charged and cyclically moving toward the surface of the advancing sheet to initiate an arc and then away from the surface of the advancing sheet to extinguish the arc;

c. a high-voltage electrical power source to supply electrical power to the cyclically moving electrode, wherein the electrical power is connected to the electrode through a current-limiting choke to provide a controlled high current density arc discharge at a relatively low maintenance voltage in the gap between the charged electrode and the grounded electrode when the electrodes directly oppose each other;

d. means for controlling the size of the perforations and their spacing along the length of the moving sheet within predetermined limits by controlling the current density and time duration of the arc discharge at preselected values to produce the desired hole size and preselecting the cyclic frequency of the moving electrode in relation to the speed of sheet advance to produce the desired hole spacing along the sheet.

In alternate embodiments, the apparatus additionally includes multiple cyclically moving electrodes incorporated and spaced laterally across the sheet at intervals corresponding to the desired lateral spacing of the perforations with said electrodes supplied from a high voltage source and opposed on the opposite side of the sheet by a grounded electrode. In addition, each cyclically moving electrode supplied from a high voltage source can be a rotating disc having at least one pin mounted on the periphery of the disc and said disc electrode can be opposed by an electrically grounded disc electrode having pins mounted along the periphery synchronously rotating with the high voltage disc electrodes providing a grounded pin to oppose each high voltage pin on opposite sides of the sheet.

BRIEF DESCRIPTION OF THE DRAWINGS

FIG. 1 shows a schematic of the electrical circuit used to operate the apparatus of the present invention.

DETAILS OF THE INVENTION

This invention will be described in relation to the drawings.

Figure 1:
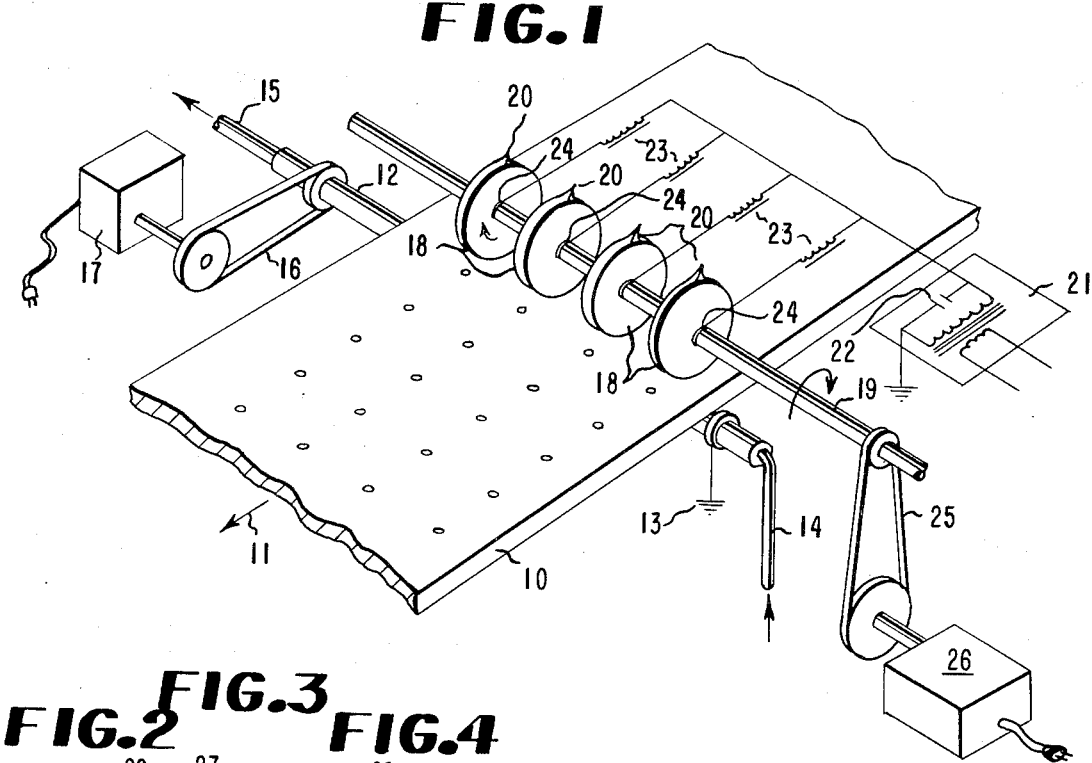
FIG. 1 is an isometric view of a preferred embodiment of this invention showing a sheet material being perforated by opposing electrodes. In addition.

FIG. 1 is a schematic representation of an embodiment of the present invention. Sheet material 10 to be perforated is made to move in the direction indicated by arrow 11 by conventional means not shown in the drawings. The sheet material is made to pass over stationary bar electrode 12 which for safety reasons is grounded at 13. Optionally, bar electrode 12 can be cooled by pumping coolant through input port 14 through the bar electrode 12 and out exit port 15. In addition, bar electrode 12 can be rotated by conventional mechanical means such as pulley system 16 driven by motor 17. Cooling is used to dissipate the localized heat generated at each arc location. Rotation of bar electrode 12 can be used to change that portion of the electrode surface exposed to the arc in order to reduce the surface erosion of the bar electrode.

Movable electrodes in the form of rotating discs 18 are mounted on insulated shaft 19. The rotating disc electrodes 18 each carry at least one pin electrode 20 on their periphery. Each disc is fastened to insulated shaft 19 and made to rotate by conventional means such as pulley system 25 driven by motor 26.

The term "pin electrode38 is a term of convenience and is meant to include an electrode that does address the sheet as a sharp pin, a blunt pin or a rod-like member having a convexed end, i.e., such as a hemispherical shape, that addresses the sheet.

Electrical power is supplied to rotating discs 18 from a high voltage transformer 21 wherein the secondary portion of the transformer has a capacitor 22 connected across it to provide power factor correction for the inductive loading of each of the electrode circuits. Electrical power leaves the transformer, passes through current-limiting chokes 23 to disc electrodes 18. These chokes are required to balance and limit the load to each electrode, i.e., divide the current evenly, because, without them, the first electrode to establish an arc would short circuit the transformer and reduce its voltage to a point where no other electrode would arc. In situations where the desired hole spacing between electrodes in the lateral direction is so close that crossover arcing from one disc to the other would take place, it is necessary to place insulating shields (not shown) between the rotating discs 18 to prevent crossover arcing.

Electrical connection is made to each disc through a slip ring 24.

An expedient slip ring for each disc can be made from a ball bearing. To conserve lateral space and permit close positioning of the discs, the bearing can be recessed in the disc with the outer bearing race pressed to fit. The inner bearing race is provided with a bore sufficiently larger in diameter than shaft 19 so that a sleeve can be pressed into this bore and also provide a clearance for shaft 19. This sleeve is in turn attached to a strap which acts as the electrical connector to choke 23. This strap is fastened to the machine frame through suitable electrical insulating means. Thus, the bearing will provide more than adequate support for the shaft while acting as a current-carrying slip ring for the electrodes.

An alternate arrangement which eliminates the need for individual slip rings in each disc includes a series of stationary pin electrodes replacing the grounded bar electrode 12. Each of these pin electrodes would be fed from the secondary side of transformer 21 through the current-limiting chokes 23. Discs 18 carrying pin electrodes 20 would then be carried on a conducting shaft instead of an insulating shaft and an electrical return connection would be made through the shaft bearings and machine frame to the power supply.

The electrical system described is designed to accommodate the use of a conventional, existing, alternating-current power source. Other arrangements such as the use of individual transformers for each electrode disc can also be used. The electrical system required further depends on whether DC or AC voltage is used and the frequency of the AC voltage. AC voltage generally is preferred since the use of DC voltage requires additional, generally more complex considerations for the high voltage-high current supply and for the mode of current limitation.

In operation, power is supplied to the rotating discs and each time pin electrode 20 opposes bar electrode 12, arcing occurs between the pin electrode and the bar electrode perforating the sheet separating the two electrodes. The high current arcs so produced are difficult to extinguish. However, further rotation of the disc extinguishes the arc as pin 20 moves away from bar electrode 12. Further rotation of the disc will again bring the pin electrode in opposing relationship to grounded bar electrode 12 while the sheet to be perforated is advancing and when arcing occurs a second time a second hole is perforated in the sheet. Thus, as the sheet advances and the discs rotate, arcing occurs each time the pin electrode opposes stationary bar electrode and an array of perforations is produced.

Figures 2, 3, 4:
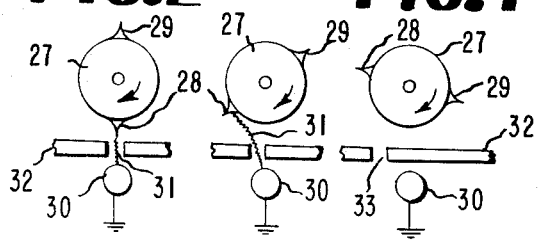
FIGS. 2, 3 and 4 show a sequence of drawings illustrating an electric arc being developed and extinguished.

FIGS. 2, 3 and 4 show more clearly the sequence of action which occurs as a disc carrying two pin electrodes is used to perforate sheet material.

Figure 5:
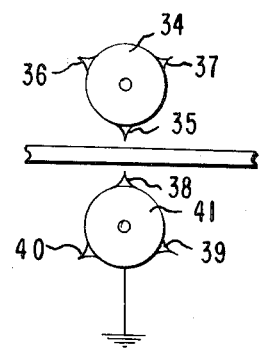
FIG. 5 shows an alternate embodiment of the present invention wherein the charged and grounded electrodes are both pin electrodes synchronously rotating to establish and extinguish an electrical arc.

In FIG. 2, disc 27 carrying pin electrodes 28 and 29 is positioned so that pin 28 opposes a grounded bar electrode 30. Power is supplied by means not shown and an arc 31 is established between the two electrodes perforating the intermediate sheet 32. Referring to FIG. 3, as disc 27 rotates, arc 31 tends to elongate and follows pin 28 until pin 28 has moved a sufficient distance away from electrode 30, as shown in FIG. 4, to extinguish itself, leaving intermediate sheet 32 with a perforation 33 at the point where arcing passed through the sheet material. This sequence will then repeat itself when pin electrode 29 now opposes grounded bar electrode 30. It can be well appreciated that one or more electrodes can be located on the periphery of a disc electrode and, in addition, the grounded electrode can also be a rotating disc having pin electrodes mounted on the periphery sequenced to rotate and oppose the pin electrodes on the power-fed disc. Such an embodiment is shown in FIG. 5 wherein power-fed disc 34 is equipped with three pin electrodes 35, 36 and 37 each opposed and synchronously rotating with pin electrodes 38, 39 and 40 on grounded disc electrode 41.

While it is shown that the rotation of the disc is in the same direction that the sheet material is made to travel, it has also been found that rotation of the disc can be in a direction opposite to the travel of the sheet material. However, smaller holes are produced.

The relationship between the rotational speed of the power discs (W) in rpm and sheet speed (V) in feet per minute for a longitudinal hole spacing of (S) in feet can be expressed in terms of the number of pin electrodes (N) as follows:

$$W = V/NS$$

Thus, for a web velocity of 900 feet per minute a desired hole spacing of 1 inch (1/12 foot) using a disc having two pin electrodes 180° apart $$W = 900/(2 \times 1/12) = 5400 \text{ rpm}$$

Note that the diameter of the disc and the length of the pin electrodes are not included in this relationship. These dimensions are governed by the voltage level required for perforation. Typically, for a 10 KV, 10 KHz voltage used to perforate foam sheeting, an arc of about 7 inches develops before the arc extinguishes itself. Thus, if a disc radius of 2.25 inches and a pin length of 2.25 inches is used, providing a total electrode radius of 4.5 inches, the disc will rotate about 120° for an arc path length of about 7.8 inches without counting the added path length the arc must travel to pass through the hole which has also moved in relationship to the arcing pin electrode. Therefore, extinction of the arc is assured before the second pin electrode on the disc opposes the grounded bar electrode for the start of a new perforating sequence.

A system as shown in FIG. 1 has been assembled and used to perforate a microfoam sheet (produced according to U. S. Pat. application Ser. No. 797,312, filed Dec. 27, 1968, and now issued U.S. Pat. No. 3,637,458). Holes 3/16 inch in diameter spaced 2 inches apart across the sheet and 1 inch apart in the direction of sheet advance were produced in said microfoam sheeting having a thickness range of 60–90 mils. Four pin wheel electrodes with a total electrode radius of 2.80 inches and a disc radius of 1.50 inches (pin length 1.30 inches) were used which contained two pin electrodes spaced 180° apart on the disc periphery.

Discs 18 were spaced 2 inches apart on shaft 19 and were rotated at 3,600 rpm to produce holes spaced 1 inch apart in the sheet moving at 600 fpm. The pin electrodes, when in closest proximity to the foam sheeting surface, operated with an air gap of essentially 0.020 inch. Chokes 23 were typically 0.2 Henry with a DC resistance of less than 20 ohms. Power factor correcting capacitors typically 0.001µf were connected across each choke in place of capacitor 22. A capacitor 22 with a value typically 0.004µf would provide equivalent power factor correction; however, the use of individual capacitors at each choke permits correction for variations in individual chokes and is a preferred arrangement. Transformer 21 was a well-regulated 7.5 KVA, 10 KHz high-voltage transformer providing a gap voltage typically 10 KV rms before breakdown. Gap voltage at breakdown was typically about 300 volts with an initial current of 1 ampere.

An alternate arrangement, which would be generally higher in cost, would employ an individual transformer to feed each electrode disc to completely avoid any electrode disc interaction. Transformers in this case should be a power-limiting type such that the secondary impedance provides the current-limiting function of chokes 23. A 220-V input, 15-KV output, 1.5-KVA transformer of this form was used successfully. The DC resistance of the secondary was 365 ohms. Power factor correction was provided by placing a capacitor of about 1 $\mu$f across the primary of the transformer which had an inductance of about 0.25 Henry. In this case, as well as in those described supra, capacitance values are chosen to provide a power factor approaching unity but avoiding resonance and its attendant instability during any part of the operating cycle.

It should be understood that other current-limiting devices, e.g., capacitors, could be equally as effective as the chokes described. Chokes are preferred for the high current levels employed in practicing this invention since they are generally less costly than capacitors in this current-handling region. Chokes, additionally, are easily (and at low cost) fabricated to meet certain nonlinear impedance-current characteristics which can be useful for additional current control in these perforation applications.

One of the important features of this invention is the fact that controlled arcing can be used to systematically perforate a thermoplastic sheet material by providing a high current density with a relatively low maintenance voltage between two electrodes placed on opposite sides of the thermoplastic sheet. The electrical aspects significant to the description of this important feature will be described in relation to the accompanying drawings, particularly FIG. 6, showing a typical plot of voltage vs. current as it applies to the electrical circuit used in the present invention and shown in FIG. 1.

Figure 6:
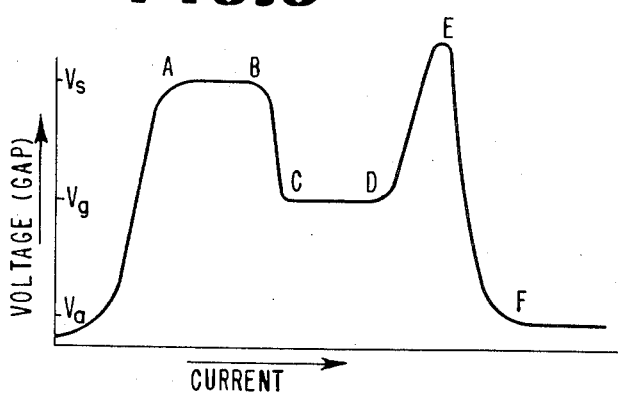
FIG. 6 is a graph of Voltage v. Current as it applies to an electrical circuit such as that used in the present invention wherein the arc is maintained at a high current density but relatively low voltage across the gap between the two electrodes.

Referring to FIG. 6, as voltage is applied and increased, the voltage across the discharge gap increases as shown graphically in FIG. 6 from O to A, at which point a value of gap voltage, $V_S$, known as the sparking potential, is reached. With a further increase in voltage, the voltage in the gap remains essentially constant at this sparking potential level of $V_S$. However, the current flow through the current-limiting impedance, i.e., choke, and discharge gap increases as much as eight orders of magnitude, from essentially picoampere to microampere levels, as shown graphically from A to B.

At the higher current level near point B, space charge effects will be predominant in the discharge gap with the result that the impedance of the gap will be significantly reduced so that a much lower gap voltage $V_g$ is required to maintain a slightly increased current, as shown graphically from B to C. When this impedance change occurs in the gap, the voltage drop across current limiters increases as the current flowing through the series circuit of the current limiters and discharge gap increases from B to C.

As the current is further increased by further increasing the applied voltage, the gap voltage remains essentially constant at a value of $V_g$, and the discharge (a glow discharge) spreads over the surface of the electrodes, and as it spreads, the current density remains essentially constant while current flow in the gap increases as shown from C to D. When the whole electrode surface is covered by this glow discharge, the gap voltage must increase to increase the current (and hence the current density), as shown from D to E. At this high current level, the heating effect (ohmic or $I^2R$ heating) of the high current density both on the electrodes and on the surrounding gaseous medium in the gap produces additional electrons and ions. This again significantly reduces the gap impedance such that a high current is maintained at a substantially reduced gap voltage $V_a$. The gap "breakdown" is quite pronounced as shown from E to F.

The variable nature of the impedance of the gap as the applied voltage is increased, makes it evident that a series current-limiting impedance is essential if an applied voltage is anticipated which will exceed a value of $V_S$. Without such a current limiter, there would be no control of the discharge current in the gap. From further consideration of FIG. 6, it is evident that operation of a discharge gap at a point to the left of point C will usually be at an energy level too low to be useful for perforating thermoplastic sheet materials. In the region from C to E, the energy level is in a range found useful for perforating according to the prior art (see U. S. Pat. No. 3,385,951, Bancroft et al., Col. 3, Line 27, to Col. 4, Line 4). The region from D to E has been found to be particularly useful, since the slope of the voltage-current curve makes the state of the art control techniques easily applicable to the control of the energy level in each discharge for the length of time available in the process for perforating. The region beyond E has been avoided due to the hitherto lack of control of the discharge and the difficulties of arc extinction attendant with the low voltage ($V_a$) required to maintain the high current discharge in this region. For the puspose of clarification of terminology, $V_g$ and $V_a$ are defined as the glow discharge and arc discharge maintenance voltages, respectively. $V_g$ is also synonymous with the maintenance voltage for what is commonly called the "spark" which is produced at pressures greater than 100 mm. Hg. The discharge in the region C → D → E is often erroneously called an arc, since arcs occur in the region E → F → . The operating regions depicted in FIG. 6 are dependent on the applied voltage and the circuit impedance. As an example, for a gap of 0.100 inch the gap voltages described supra would typically be:

$$V_s = 10,000 \ V$$

$$V_g = 1,000 \ V$$

$$V_a = 10\text{--}300 \ V$$

at atmospheric pressure.

Normally, the applied voltage has a fixed value, predetermined to be sufficient to cause initial breakdown of the dielectric material in the discharge gap (the thermoplastic sheet and air gap). The impedance value of the current limiters is chosen with a predetermined value such that, following initial breakdown, the desired current and corresponding voltage in the discharge gap will be maintained. Once breakdown occurs in the gap, the operating point on the curve is reached almost instantaneously (limited only by the time constants of the circuit elements, which are generally in the microsecond range). Thus, if the system is designed to operate at point D of FIG. 6, with the application of voltage, the voltage profile in the gap will follow that indicated by the curve as shown from 0 → A → B → C → D and operation at point D will occur essentially instantaneously.

Perforation of sheet material to provide invisible holes for breathability can be achieved by operating in region B to D. To produce holes with a nominal 0.030 inch diameter as described in U. S. Pat. No. 3,385,951, supra, is achieved by operating in the D to E region with a minimum discharge time of 50 milliseconds (Col. 3, Line 60). Production of holes 1/8 inch to 3/8 inch diameter operating in this region would require an impractically long time for normal sheet processing speeds, if possible at all.

It was found that operation in the arc discharge region described by that portion of the graph of FIG. 6 from point F and beyond was required to produce perforations in the size range of ⅛ inch diameter and larger. The high current density arc releases its high energy in about $10^{-6}$ seconds (1 microsecond) and essentially "blasts" the material from the sheet to form the hole. In the system described, the high current density arc exists typically for 8 milliseconds; the major portion of this time period is required to extinguish the arc.

A typical voltage waveform can be viewed by connecting an oscilloscope across a discharge gap. With the applied voltage supplied from a 10 KV, 10 KHz source, voltage at breakdown would drop from 10 KV to typically 300 V rms when the electrodes are brought together. As the electrodes separate, the gap voltage increases until extinction after about 8 milliseconds. The voltage remains at 10 KV for about 4 milliseconds after which arcing occurs again between the next electrode pair. Current flowing in the gap is the inverse of the above, being a maximum at breakdown (typically greater than 0.5 amps rms) and decaying to a low value (less than $10^{-12}$ amps) when discharge ceases.

This invention is applicable to perforating many types of thermoplastic sheets including polyolefin sheets, e.g., polyethylene and polypropylene; polyester films, e.g., polyethylene terephthalate; polyvinyl sheets, e.g., polyvinyl chloride; polyamides, e.g., nylon. This invention is particularly useful in perforating thermoplastic foam sheets such as the microcellular polyolefin foams of U. S. Pat. application Ser. No. 797,312, filed Dec. 27, 1968, and now issued U.S. Pat. No. 3,637,458, because it perforates the foam leaving neat perforations without destroying immediately adjacent foam cells.

We claim:
1. An apparatus for forming perforations in a thermoplastic sheet comprising:
   a. means for continuously advancing a thermoplastic sheet;
   b. positioned above one side of the advancing sheet, multiple electrically charged discs having at least one pin mounted on the periphery of each disc, said discs spaced laterally across the sheet at intervals corresponding to the desired lateral spacing of the perforations and rotating to cyclically move said pins toward the surface of the advancing sheet to initiate an arc and then away from the surface of the advancing sheet to extinguish the arc;
   c. positioned above the opposite side of the advancing sheet and opposing each electrically charged disc, multiple grounded discs having at least one grounding pin mounted on the periphery of each disc, said grounded discs synchronously rotating with the electrically charged disc electrodes providing a grounding pin to oppose the electrically charged pins;
   d. a high-voltage electrical power source to supply electrical power to the rotating discs and the cyclically moving electrically charged pins, wherein the electrical power is connected to the discs through a current-limiting choke to provide a controlled high current density arc discharge at a relatively low maintenance voltage in the gap between a charged disc pin and a grounded disc grounding pin when the charged disc pin and grounding pin directly oppose each other; and
   e. means for controlling the size of the perforations and their spacing along the length of the moving sheet within predetermined limits by controlling the current density and time duration of the arc discharge at preselected values to produce the desired hole size and preselecting the cyclic frequency of the moving electrode in relation to the speed of sheet advance to produce the desired hole spacing along the sheet.

2. The apparatus of claim 1 wherein the rotating disc electrode has two pins mounted 180° apart on the periphery of the electrode.

3. The apparatus of claim 1 wherein the rotating disc electrode has three pins mounted 120° apart on the periphery of the electrode.

* * * * *

UNITED STATES PATENT OFFICE
CERTIFICATE OF CORRECTION

Patent No. 3,760,153  Dated September 18, 1973

Inventor(s) Robert Dillwyn Davies and Leslie Yarnall Weston, Jr.

It is certified that error appears in the above-identified patent and that said Letters Patent are hereby corrected as shown below:

Column 1, line 64, -- of the discs with the electrically grounded disc electrodes -- should appear after "periphery".

Column 2, line 46, "'pin electrode 38'" should read -- "pin electrode" --.

Signed and sealed this 1st day of January 1974.

(SEAL)
Attest:

EDWARD M. FLETCHER, JR.
Attesting Officer

RENE D. TEGTMEYER
Acting Commissioner of Patents